Figure 1:
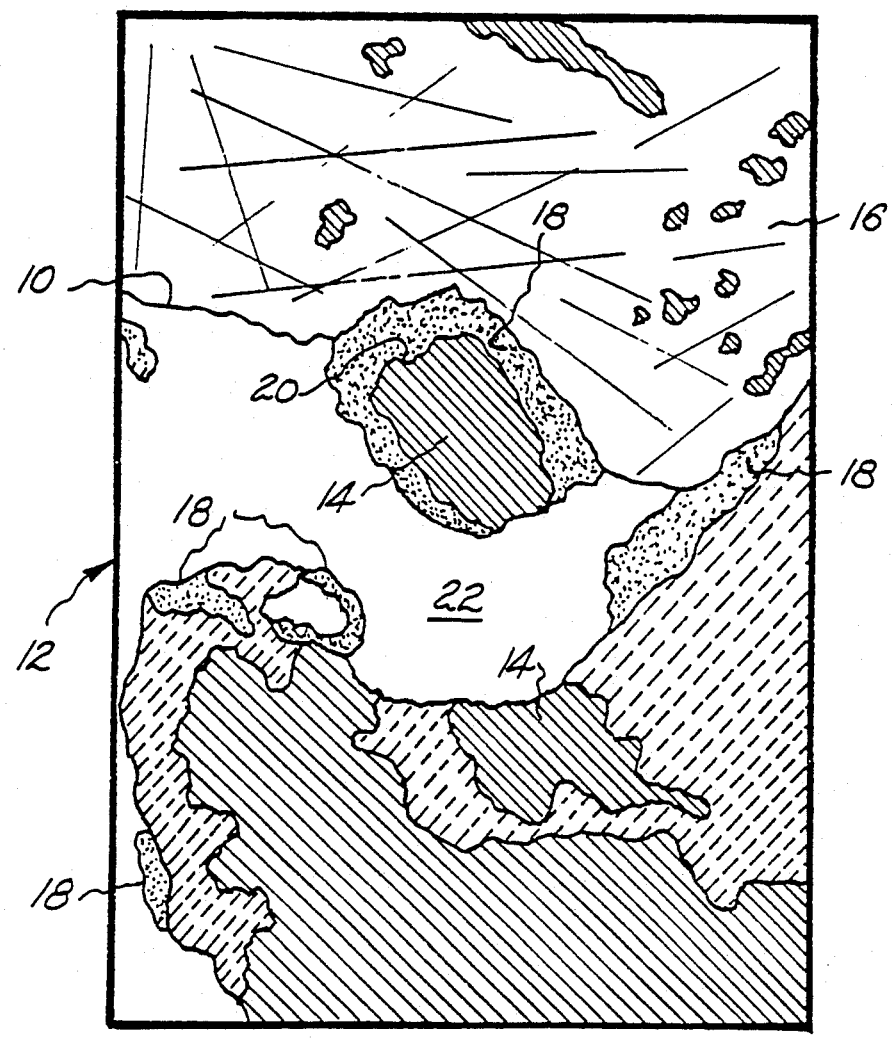

United States Patent [19]

Stanton et al.

[11] Patent Number: 4,851,163

[45] Date of Patent: Jul. 25, 1989

[54] BIOFOULING RESISTANT APPARATUS FOR WASTEWATER TREATMENT

[75] Inventors: Robert J. Stanton, Walworth; Chad A. Sheckler, Newark, both of N.Y.

[73] Assignee: The Refraction Corporation, Newark, N.Y.

[21] Appl. No.: 267,483

[22] Filed: Nov. 4, 1988

[51] Int. Cl.⁴ .............................................. B01F 3/04
[52] U.S. Cl. ................................................... 261/122
[58] Field of Search ....................................... 261/122

[56] References Cited

U.S. PATENT DOCUMENTS

| | | |
|---|---|---|
| 1,473,331 | 4/1923 | Bechhold . |
| 1,557,234 | 10/1925 | Bechhold . |
| 1,557,235 | 10/1925 | Beckhold . |
| 2,038,451 | 4/1936 | Schattaneck ........................ 261/122 |
| 2,283,883 | 5/1942 | Conconi . |
| 2,774,585 | 12/1956 | Wirts .................................... 261/122 |
| 3,235,089 | 2/1966 | Burroughs . |
| 3,698,931 | 10/1972 | Horowitz . |
| 3,753,746 | 8/1973 | Koerner ............................. 261/122 |
| 3,978,176 | 8/1976 | Voegeli ............................... 261/122 |
| 4,145,291 | 3/1979 | Console . |
| 4,157,929 | 6/1979 | Kubicek . |
| 4,169,911 | 10/1979 | Yoshida . |
| 4,382,867 | 5/1987 | Schmit et al. . |
| 4,569,805 | 2/1986 | Hume et al. ........................ 261/122 |

FOREIGN PATENT DOCUMENTS

| | | |
|---|---|---|
| 2102912 | 8/1972 | Fed. Rep. of Germany . |
| 3546328 | 7/1986 | Fed. Rep. of Germany . |
| 473979 | 10/1937 | United Kingdom . |

OTHER PUBLICATIONS

No. EPA/625/8-85/010, Oct. 1985, "Summary Report-Fine Pore (Fine Bubble), Aeration Systems", pp. 34-36.
"In Place Cleaning System for Ceramic Grid Fine Bubble Aeration", 1983, Water Pollution Control Corp., Milwaukee, Wisconsin 53209.
"Ceramic Grid Aeration System", 1983, Water Pollution Control Corp., Milwaukee, WI, 53209.
"Flexible Membrane Disc Diffusers", 1987, Water Pollution Control Corporation, Milwaukee, WI 53201.
"TAFA-The Ultimate Arc Spray", 1987, Bulletin No. 400.
TAFA-Technical Data Bulletin-Methods for Particle Size Control & Spraying, #1.11.3.1 (1983).
TAFA-Technical Data Bulletin-Spraying Procedures-#1.9.1.2-01T, (1988), Concord, NH 03301.
TAFA-Technical Data Bulletin-Copper Spraying Procedures-1.9.1.2-05T, (1988).
TAFA-Technical Data Bulletin-Various Spraying Materials-1.9.1.1.1 (1988).
TAFA-Technical Data Bulletin-Gives Greater Detail on the Arc Spray System that is Mentioned in Bulletin #400-1.1.8.1 (1987).

Primary Examiner—Tim Miles
Attorney, Agent, or Firm—Martin LuKacher

[57] ABSTRACT

In order to maintain the uniformity of distribution of pores and consistency of pore sizes in a ceramic body used in treatment of biologically active liquor such as wastewater, there is provided a composite body consisting essentially of porous ceramic material having a thin layer of biocidal materials attached to the boundaries of the exposed particles of ceramic in a shallow layer facing the liquor. The layer of biocidal material is of microscopic thickness so that the porosity of the ceramic is preserved and biofouling which would otherwise prevent efficient operation is inhibited. The apparatus is useful as a bubble diffuser in the aeration of wastewater liquor.

23 Claims, 2 Drawing Sheets

BIOFOULING RESISTANT APPARATUS FOR WASTEWATER TREATMENT

The present invention relates to apparatus for treating biologically active liquor such as wastewater and particularly to porous ceramic bodies which inhibit organic growth tends to clog and foul the body (either sliming or filamentous growth) without substantial interference with the porosity of the body.

The invention is especially adapted for use in ceramic fine bubble diffusers, such as the domes, discs, plates or tubes through which air is passed for aeration of wastewater and provides such diffusers with biocidal protection.

Porous ceramic bodies are widely used in wastewater treatment for the diffusion of air and other gases into biologically active liquor, such as wastewater. In activated sludge aeration applications the conditions are highly favorable to the growth of sliming or other organisms which over time tend to clog the pores of the body or support filamentous organic growths. Such growths cause coalescence of bubbles above the diffuser and reduce the oxygen transfer efficiency of the aeration system. Diffusers come in various shapes such as domes, plates, discs and tubes. Ceramic diffusers are typically made from quartz (silica) or alumina ($Al_2O_3$). Typical pore diameters are from 40 to 200 microns (um). Glass or other organic and inorganic materials are used as binders and yield highly uniform pore distributions capable of generating gas bubbles of small size which enhances the dissolving of oxygen into the wastewater. The dissolved oxygen supports the activity of aerobic bacteria which purify the wastewater. Such diffusers are described in a report, EPA/625/8/-85/010 entitled "Fine Pore (Fine Bubble) Aeration Systems" issued by the Water Engineering Research Laboratory of the U.S. Environmental Protection Agency and dated October 1985. This report also points out that a major factor limiting the effective operation of such diffusers in wastewater treatment and aqua-culture has been the tendency for the body to support the attachment of sliming or filamentous growth which tends to clog or foul the surface of the diffuser, increasing the pressure drop (the required pressure to support aeration) or causing the bubbles to coalesce into larger bubbles, and in general interfering with system performance as measured by the oxygen transfer efficiency of the system. Such sliming and growth mechanisms are referred to as biofouling and are particularly troublesome where the wastewater (sewage) liquor strength (nutrient concentrations) tend to promote biological growth.

Techniques which have been used in removing these growths heretofore have involved cleaning by physical means, typically requiring draining of the aeration basins since the diffusers cannot be removed, or infusion of acid vapors. Such cleaning may involve the use of caustic chemicals or gases into the system which themselves can create environmental hazards.

The problem of avoiding or inhibiting biofouling is exacerbated by the need to maintain the porosity of the ceramic body which is used as the diffuser. Any means which decreases the porosity of the body adversely effects the oxygen transfer efficiency and may require more power in the form of higher capacity (higher horsepower) pumps and compressors to force the air or other gases through the body. In other words, the back pressure imposed by the body should not be materially increased in the effort to avoid biofouling.

It is the principal object of the present invention to provide improved ceramic bodies which inhibit biofouling without significantly increasing the back pressure imposed by the body or decreasing the overall efficiency of the system.

It is a further object of the present invention to provide improved bubble diffusers utilizing porous ceramic bodies which may be used without cleaning or replacement for a much longer period of time (which may be 10 to 20 times longer) in environments which subject the diffusers to biofouling than has been reported for conventional porous ceramic diffusers.

It is a still further object of the present invention to provide an improved porous ceramic diffuser in which the uniformity of distribution of pores and consistency of pore sizes is maintained and which also inhibits biofouling.

Briefly described, a porous ceramic body for use in treatment of organically active liquors which are exposed to one side of the body is provided by making a composite body having a microscopic layer of biocidal (antibacterial) material physically or chemically bonded in a shallow layer extending inwardly from the exposed surface. The microscopic layer of biocidal material is bonded only to the exposed particles which define the boundaries of the pores in the shallow layer. This permanently bonded biocidal layer preserves the inherent uniformity of distribution of pores and consistency of pore sizes of the ceramic body (the substrate on which the biocidal material is bonded) over long periods of exposure in environments where organic fouling would otherwise prevent efficient operation. The biocidal materials may be metals or metal compounds or organic polymers. The metals are preferably applied by thermal arc spraying on to the exposed surface. The thermal arc spraying deposits microscopic metallic droplets which crystalize on the grain boundaries to provide the microscopic layer of biocidal material. Organic polymers which are biocidal are permanently bonded by chemical grafting using mixtures of of monomers and organic biocidal materials which polymerize on the particle boundaries. Metals or metal compounds such as oxides may be applied in a fine powder as by sifting to the surface which will be exposed to the liquor. The body with the powder is then fired and the powder diffuses into the shallow layer where it bonds to the particles at the boundaries of the pores. In every case the pore size is not significantly decreased, the microscopic layer being of less thickness than the pores. For example, the pores in a fine bubble diffuser may be from 40 to 200 microns in diameter. The microscopic layer is preferably less than 30 microns in thickness. The depth the shallow layer may be less than a millimeter in thickness; much less than 5% of the thickness of the ceramic body. Thus, the pore size decrease is insignificant and can be offset by particle size selection in the ceramic substrate mix, and the back pressure is not significantly increased. For example, in one actual test the flow rate for constant air pressure in ceramic dome is reduced from 16 cfm to 15.5 cfm. More significantly, actual tests show that after hundreds of hours of exposures to the liquor in an activated sludge basin the antifouling diffusers (tubes) which have the bonded layer forming a copper ceramic composite by thermal arc spraying had 75% and 90% of their surfaces clean while control tubes were completely coated with approximately ½-inch of organic build-up.

Figure 2:
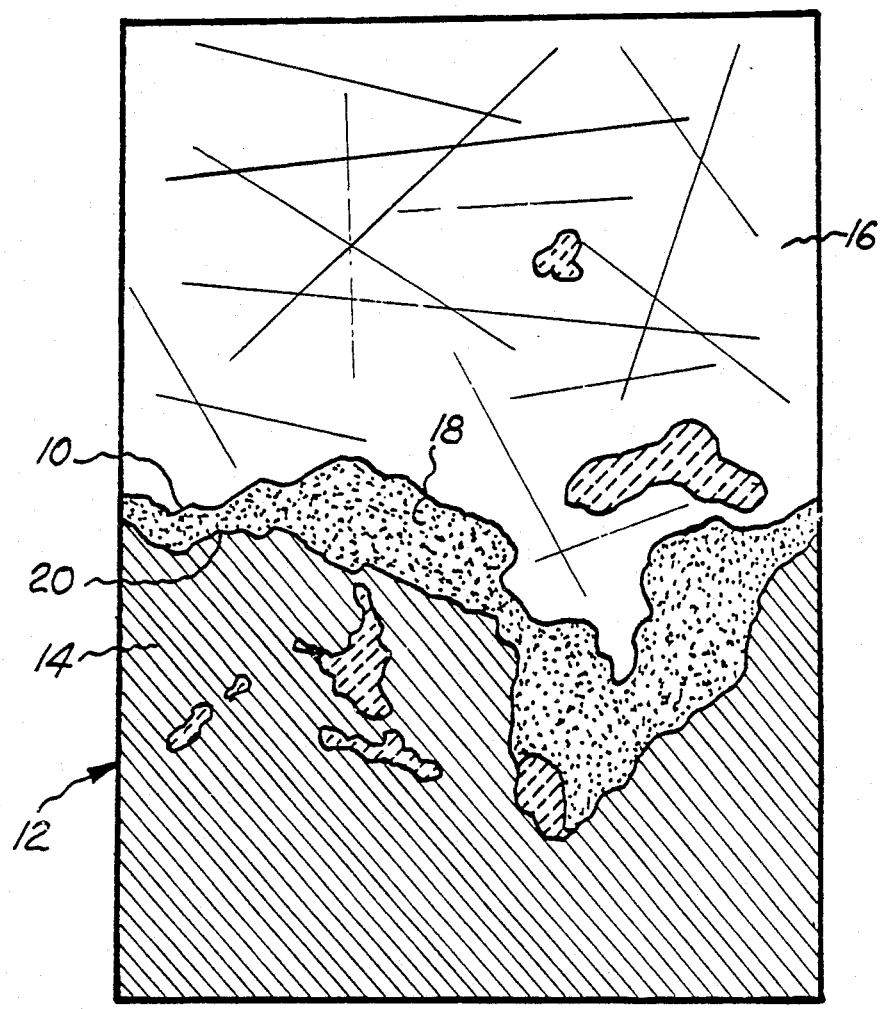

The foregoing and other objects, features and advantages of the invention will become more apparent from a reading of the following description in connection with the accompanying drawing in which:

FIG. 1 is a micrograph of the surface of a ceramic diffuser which is adapted to be exposed to the organically active liquor showing a microscopic layer of recrystalized copper after coating by thermal arc spraying, the micrograph being a 100 times enlargement of a cross section in a direction perpendicular to the exposed surface; and FIG. 2 is a micrograph similar to FIG. 1 at a 200 times enlargement.

FIGS. 1 and 2 illustrate the surface 10 of a porous ceramic diffuser 12 (the surface exposed to the wastewater) which is made by recrystalizing metallic copper 18 on the boundaries of the particles 14 of aluminum oxide (alumina-$Al_2O_3$) using a thermal arc spray gun. Prior to application of the metallic copper the diffuser was made in a conventional manner by bonding (as by sintering) aluminum oxide particles with a glass binder. It will be understood that other ceramic materials such as silica, mullite, silicon carbide, garnet or other man-made and natural refractory materials may be used to form conventional porous ceramic diffusers. Binders may be glasses, various minerals such as clays and feldspars and organic materials such as phenolic resins and thermosetting plastics.

The upper part 16 of the FIGS. is an epoxy body which was used to impregnate the sample for polishing purposes. The surface shown is perpendicular to the surface 10 of the ceramic diffusing material to which the copper microscopic layer 18 is attached in order to make the micrograph. The cross section is polished. In FIG. 1 the dark regions are particles at or adjacent to the exposed surface 10. These particles have boundaries 20. In the cross-section, regions of recrystalized copper 18 at these boundaries are seen. The copper also coats the boundaries which define the pores 22. These are hollow and are seen in relief in the figure. The thickness of the microscopic copper layer is less than 30 microns. The copper penetrates a shallow layer of less than 1 millimeter.

FIG. 2 shows a small region at the particle surface (the pore boundary 20). The recrystalized copper layer 18 of microscopic thickness is apparent from the micrograph.

The diffuser is a monolithic, copper/ceramic composite body. In making the diffuser illustrated in the micrographs of FIGS. 1 and 2, metallic copper was applied to the exposed surface 12 using a thermal spray gun manufactured by TAFA Inc. of Concord, N.H. The equipment is also known as an electric arc sprayer. The gun was spaced eight inches from the surface. The current was 100 to 150 amps. The voltage was 28 volts. The air pressure applied to the gun was 60 psi. Two passes were used. As shown in the micrographs the grains 14 on the exposed surface of the ceramic substrate ($Al_2O_3$ grains) were uniformly coated with a 15 to 30 micron layer of copper. The permeability of the copper/ceramic composite which was a dome 7 inches in diameter and ¾″ thick, was 15.5 cfm at 2 inches of water column pressure. This compares to a permeability which passed 16.0 cfm (a reduction of 0.5 cfm) of the same diffuser without the copper layer 18.

Other metals or metal oxides may be used in making a composite metal/ceramic porous body having a biocidal layer of metal. These metals include a copper gold alloy (consisting essentially of copper, 99% copper 1% gold). Othe biocidal metals which may be used include silver and manganese.

A copper/porous ceramic composite diffuser was also made using cupric oxide (CuO). The material was ground to a powder of less than 100 micron size particles. Six grams of the powder was then sifted through a screen onto the exposed surface of a 12 inch×12 inch×1 inch alumina diffuser plate. The plate was then fired to 1,220° C. and then cooled. The cupric oxide was found to have diffused into the top 1 millimeter (mm) of the surface and reacted with the ceramic bonding component (glass) to form a microscopic layer at the grain boundaries. The permeability of the composite body was measured and a less than 0.5 cfm change in flow for a two inch water column pressure was measured between the uncoated and coated body.

Organic biocidal ceramic composite bodies were also fabricated by spraying or brushing a mixture of organic polymer containing a biocidal component on the surface and then allowing the polymer to cure which chemically bonds or grafts the polymer coating to the surfaces of the grains in a manner similar to that shown with the copper coating. The materials which were used were identified by the tradename Hexetidine which is available from Angus Chemical Co. of 2211 Sanders Road, Northbrook, Ill. 60062, Barquat which is available from LONZA, Inc. of 17–17 Fairlane, Route 208, New Jersey 07410, Bioban, (CS-1139) which is also available from Angus Chemical (CS-1139) and Algon which is available from Thor Chemicals of 37 North Avenue, Norwalk, Conn. Hexetidine is chemically known as 5-amino-1, 3-bis(2 ethylhexyl)-5-methylhexahydropyrimidine. Barquat is chemically known as alkyl dimethyl benzyl ammonium choride ($C_{14}50\%$, $C_{12}40\%$, $C_{16}10\%$). Bioban is chemically known as a solution of 4,4-dimethyloxazolidine and 3,4,4-trimethyloxazolidine and Algon (100-active component) is chemically known as 3-(3,4-Dichlorophenyl)-1,1-dimethylurea N(Trichloromethylthio)phthalimide.

Chemical bonding or grafting involves the activation of a substrate. Once the substrate has been activated, chains of monomers linked by carbon-carbon bonds grow on the substrate as whiskers. These whiskers from a coating. The polymers which may be used and react with ceramic particles, such as alumina and silica include, tertiary hydrogen nd polypropylene (see formula 1 below), the amide hydrogen in proteins (see formula 2 below) and the hydroxyl hydrogen in polysaccharides (see formula 3 below).

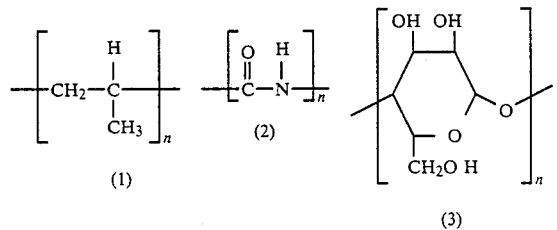

The chemistry of chemical bonding or grafting is described in greater detail in U.S. Pat. No. 3,698,931. Briefly, graft initiators or prepolymers may be used which have the capacity of removing the active hydrogens and concomitantly initiating the growth of the polymer chains at the substrate. The effect can be represented as follows:

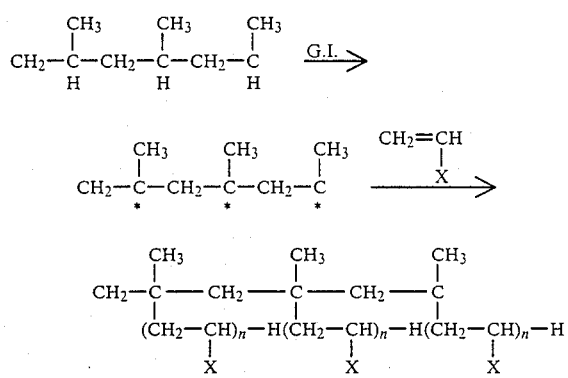

Where * represents either a free radical, anion or cation, depending upon whether the graft initiator removes the hydrogen and one electron, no electrons or two electrons, respectively.

represents a unit of vinyl monomer where X governs the property or properties that are obtained. In many instances, a mixture of monomers is employed. The polymer chains are length controlled by virtue of the mixture used and are permanently attached to the substrate (the particle boundaries). The linkage between the graft polymer and the substrate is covalent in nature. Therefore, the graft-polymer cannot be leached from the substrate. In other words, as is the case for the metal or metal oxide/ceramic composite bodies, the coatings are insoluble in the liquor or at worst only slightly soluble.

In essence, the chemical grafting consists of growing polymer chains on a backbone chain of the substrate. The graft polymer chains are formed from vinyl monomers or monomers containing appropriate functionability, e.g., groups such as hydroxyl, carboxyl, epoxy, amide, amine, anhydride, etc. In other words the liable hydrogen atoms at the substrate interact with the graft initiators and are abstracted to produce a free radical. The free radical thus produced reacts with the monomer molecules in a series of steps to yield a grafted polymer chain. The process may be represented as follows:

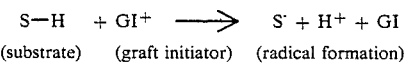
(substrate)  (graft initiator)  (radical formation)  (1)

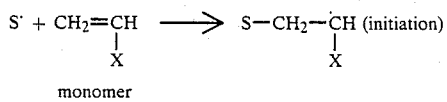
monomer (2)

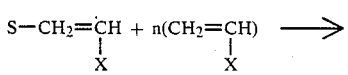
(3)

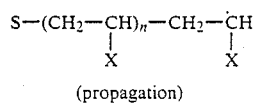
(propagation)

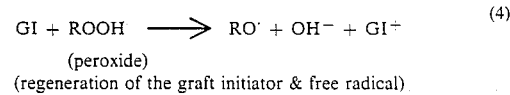
(peroxide)
(regeneration of the graft initiator & free radical) (4)

The process may be terminated by radical combination.

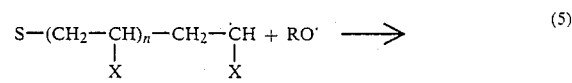
(5)

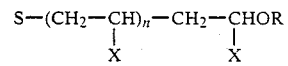

or

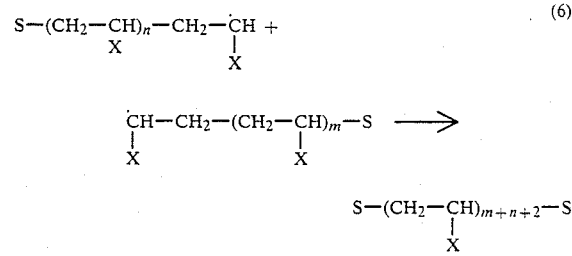
(6)

The reaction 6 provides a chemical bridge between the substrate and the coating. The side functional group X is chosen so that it has an interaction with the substrate and the fillers included in the mixture by donating electrons and then establishing coordinator ionic type of linkages in addition to covalent bonds. The following mixtures are presented by way of example.

EXAMPLE 1

| Constituent | Parts by Weight |
|---|---|
| Hydroxyl ethyl methacrylate (HEMA) | 200.00 |
| Water | 1050.00 |
| Ferrous ammonium sulfate 1% solution in water | 55.00 |
| Ammonium persulfate 5% solution in water | 55.00 |
| Barquat 50% solution in water | 70.00 |
| Pigment dispersion Phthalocyanine green | 29.00 |

Formulation was made by mixing the ingredients in the order listed. Samples were made by spraying and then curing at 150°–170° F. for 5 hours.

EXAMPLE 2

| Constituent | Parts by Weight |
|---|---|
| Pigment | 72.00 |
| Xylene | 1272.00 |
| Methyl ethyl ketone | 1269.00 |
| Liquid Epoxy Prepolymer Araldite 6010, | 690.00 |

| Constituent | Parts by Weight |
| --- | --- |
| Available from Ciba Geigy, Ardsley, New York 10502 Antimicrobial agent Hexetidine Amine hardener-Triethylene tetramine | 72.00 |
| Accelerator DMP-30 (tri-(dimethylaminoethyl phenol) Available from Rohm & Haas, Independence Mall West Philadelphia, Pennsylvania 19105 | 9.00 |
| Methyl methacrylate monomer | 2.00 |
| Methyl ethyl ketone peroxide | 0.02 |

Formulation was made by mixing the various ingredients in xylene and the ketone. It was applied by spraying. The coated pieces were dried at room temperature and then cured by heating at 120° F. for 6 hours.

EXAMPLE 3

| Constituent | Parts by Weight |
| --- | --- |
| Vinyl acrylic copolymer Haloflex 202 (copolymer of vinyl chloride, vinylidene chloride and acrylate. Available from ICI Resins Wilmington, Massachusetts 01887) | 2403.00 |
| Pluoronic F-87, 30% solution in water (A block polymer polyoxyalkylene derivative of propylene glycol. Available from BASF, P.O. Box 181 Parsippany, New Jersey 07054) | 391.00 |
| Water | 500.00 |
| Hydroxyl proply methyl Cellulose 2.5% solution in water (pH. 8.5-9.00) | 324.00 |
| Defoamer, Colloid 642 (Available from Colloid Co. 394 Frelinghuysen Avenue Newark, New Jersey 47114) | 6.00 |
| Antimicrobial agent Bioban CS 1135 An aqueous solution containing the following minimum concentrations of active ingredients: 4,4-dimethyloxazolidine 74.7% by wt.; 3,4,4-trimethyloxazolidine 2.5% by wt. | 6.00 |
| Titanium dioxide dispersion | 300.00 |

The ingredients are added, one by one, to the water with mixing. The mixture was applied by spraying or brushing followed by air drying then curing at 120° F. for about 1 hour.

EXAMPLE 4

| Constituent | Parts by Weight |
| --- | --- |
| Acrylic prepolymer Acryloid B-66 (Methyl butyl methacrylate. Available from Rohm & Haas) | 1490.00 |
| Acrylic prepolymer Acryloid A-101 (Methyl methacrylate. Available from Rohm Haas) | 584.00 |
| Methyl ethyl ketone | 945.00 |
| Methyl methacrylate monomer | 2.00 |
| Methyl ethyl ketone peroxide | 0.02 |
| Antibacterial agent Algon 100 | 52.00 |
| Pigment | 100.00 |

The ingredients were mixed in the ketone. The mixture was applied by spraying or brushing. The coated pieces were either air dried at room temperature for 10 hours or cured at 120° F. for about 1 hour.

From the foregoing description it will be apparent that there has been provided improved porous ceramic bodies which are especially adapted for use in bubble diffusers and elsewhere in wastewater treatment. Variations and modifications of the herein described bodies, within the scope of the invention, will undoubtedly suggest themselves to those skilled in the art. For example use of pigments is optional and also depends upon the color desired. Accordingly the foregoing description should be taken as illustrative and not in a limiting sense.

We claim:

1. A ceramic body for use in treatment of liquor which is biologically active and which is made by the process comprising the steps of bonding a mixture of ceramic material particles with a binder to form a porous body having pores defined by the boundaries of said particles, said body having at least one surface facing said liquor, physically bonding to said boundaries in a shallow layer of said body defined on one side by said one surface a microscopic layer of biocidal material which inhibits the formation of slime or other organic growth.

2. The body according to claim 1 wherein said particles are alumina and said binder is glass.

3. The system according to claim 1 wherein said particles are selected from the group consisting of alumina and silica, and said binder is selected from the group consisting of natural minerals, glass, and organic binder material.

4. The body according to claim 1 wherein said shallow layer is of the order of 1 mm thick and said microscopic layer does not exceed about 30 micrometers (um) in thickness.

5. The body according to claim 1 wherein said biocidal material is a mixture consisting essentially of the following constituents in parts by weight, which mixture is applied to said surface to penetrate said shallow layer and form said microscopic layer upon curing: hydroxyl ethyl methacrylate (HEMA), 200; water, 1050; ferrous ammonium sulfate (1% solution in water), 55; ammonium persulfate (5% solution in water), 55; and alkyl dimethy benzyl ammonium chloride ($C_{14}$50%, $C_{12}$40%, $C_{16}$10%) (50% solution in water), 70.0.

6. The body according to claim 1 wherein said body is a bubble diffuser and said liquor is said waste water.

7. The body according to claim 6 wherein said body is of a shape selected from the group consisting of a dome, a disc, a plate, and a tube, and said one surface is the exterior of said dome, a side of said disc, a side of said plate, or the outer periphery of said tube.

8. The body according to claim 1 wherein said bonding step is carried out by sifting metal oxide powder onto said surface, firing said body and powder so that said powder diffuses into said shallow layer and, upon firing, bonds with said particles to form said microscopic layer.

9. The body according to claim 8 wherein said metal oxide is copper oxide.

10. The body according to claim 1 wherein said biocidal material is metal, and said bonding step is carried out by thermal spraying of said metal in atomic form on said surface with the aid of an arc spray gun, said metal recrystalizing on said boundaries.

11. The body according to claim 10 wherein said metal is pure copper.

12. The body according to claim 10 wherein said metal is an alloy essentially of copper with gold.

13. The body according to claim 10 wherein said metal is selected from the group consisting of copper, silver and manganese.

14. The body according to claim 1 wherein said biocidal material is selected from the group consisting of a biocidal polymer, a metal and a metal containing compound.

15. The body according to claim 14 wherein said material is a biocidal polymer and said bonding step is carried out by molecular grafting of said polymer to said boundaries.

16. The body according to claim 15 wherein said bonding step is carried out by growing said polymer on the boundaries, said boundaries been a substrate on which said polymer is grown.

17. The body according to claim 16 wherein said growing step is carried out by applying a mixture of organic materials including a monomer and a biocidal material dissolved in a solvent to coat said boundaries in said shallow layer, and allowing said mixture to cure and chemically bond to said boundaries.

18. The body according to claim 17 wherein said applying step is carried out by spraying said mixture on said surface.

19. The body according to claim 17 wherein said applying step is carried out with the aid of an applicator carrying said mixture.

20. The body according to claim 16 wherein said biocidal material is selected from the group consisting of 5-amino-1,3-bis(2ethylhexyl)-5-methylhexahydropyrimidine, 4,4-dimethyloxazolidine and 3,4,4-trimethyloxaolidine, 3-(3,4-Dichlorophenyl)-1,1-dimethylurea N(Trichloromethylthio)phthalimide, and alkyl dimethyl benzyl ammonium chloride ($C_{14}$50%, $C_{12}$40%, $C_{16}$10%).

21. The body according to claim 20 wherein said mixture consists essentially of the following constituents in parts by weight: vinyl acrylic copolymer, 2403; copolymer of vinyl chloride, vinylidene chloride and acrylate (30% solution in water), 391; water, 500; hydroxy propyl methyl cellulose monomer (2% solution in water-pH. 8.5–9.0); defoaming agent; and a solution of 4,4-dimethyloxazolidine and 3,4,4-trimethyloxazolidine as the biocidal, 6.0.

22. The body according to claim 20 wherein said mixture consists essentially of the following constituents in parts by weight: xylene, 1272; methyl ethyl ketone, 1269; 690; 5-amino-1, 3-bis(2ethylhexyl)-5-methylhexahydropyrimidine as the biocidal, 204; triethylene tetramine, 72; tri-(dimethylaminoethyl phenol) accelerator, 9; methyl methacrylate monomer, 2; and methyl ethyl ketone peroxide, 0.02.

23. The body according to claim 20 wherein said mixture consists essentially of the following constituents in parts by weight: prepolymers-methyl butyl methacrylate, 1490 and methyl methacrylate 584; methyl ethyl ketone peroxide, 0.02; and 3-(3,4-Dichlorophenyl)-1,1-dimethylurea N(Trichloromethylthio)phthalimide as the biocidal, 52.0.

* * * * *